(12) United States Patent
Suriawidjaja et al.

(10) Patent No.: US 9,863,755 B2
(45) Date of Patent: Jan. 9, 2018

(54) AUTOMATED POSITION LOCATOR FOR A HEIGHT SENSOR IN A DISPENSING SYSTEM

(71) Applicant: Nordson Corporation, Westlake, OH (US)

(72) Inventors: Floriana Suriawidjaja, Carlsbad, CA (US); Todd S. Weston, Vista, CA (US)

(73) Assignee: Nordson Corporation, Westlake, OH (US)

( * ) Notice: Subject to any disclaimer, the term of this patent is extended or adjusted under 35 U.S.C. 154(b) by 627 days.

(21) Appl. No.: 14/527,128

(22) Filed: Oct. 29, 2014

(65) Prior Publication Data

US 2015/0049346 A1  Feb. 19, 2015

Related U.S. Application Data

(62) Division of application No. 13/769,605, filed on Feb. 18, 2013, now Pat. No. 8,944,001.

(51) Int. Cl.
*G01B 11/02* (2006.01)
*B05C 11/00* (2006.01)
(Continued)

(52) U.S. Cl.
CPC .......... *G01B 11/026* (2013.01); *B05B 12/124* (2013.01); *B05C 5/0225* (2013.01);
(Continued)

(58) Field of Classification Search
CPC .... G01B 11/026; G01B 11/14; G01C 15/004; B05C 11/1002; B05C 11/1015; B05C 11/00; B05C 5/0225; B05B 12/124
See application file for complete search history.

(56) References Cited

U.S. PATENT DOCUMENTS 5,052,338 A   10/1991  Majorca et al.
5,919,520 A    7/1999  Tateyama et al.
(Continued)

FOREIGN PATENT DOCUMENTS

CN    1460559 A    12/2003
CN  101551256 A    10/2009
(Continued)

OTHER PUBLICATIONS

Chinese Application No. 201480009248.2: First Office Action with Search Report dated Sep. 30, 2016, 7 pages.
(Continued)

*Primary Examiner* — Moshe Wilensky
(74) *Attorney, Agent, or Firm* — Baker & Hostetler LLP

(57) ABSTRACT

Apparatus and methods of determining a position of a height sensor in a dispensing system. The dispensing system includes a dispenser, height sensor, camera, and a calibration device configured to receive a signal from the height sensor. The calibration device may include an optical sensor that generates an alignment signal in response to receiving light from the height sensor and/or a fiducial that causes the height sensor to generate the alignment signal in response to a detected height change. The alignment signal is used to automatically determine the position at which the height sensor is aligned with the calibration device. The position of the height sensor relative to a camera is determined by aligning the camera with the calibration device and recording its position. The recorded coordinates of the camera are compared to the coordinates of the height sensor when the height sensor is automatically aligned with the calibration device.

13 Claims, 8 Drawing Sheets

(51) Int. Cl.
*B05C 11/10* (2006.01)
*B05C 5/02* (2006.01)
*B05B 12/12* (2006.01)
*G01B 11/14* (2006.01)
*G01C 15/00* (2006.01)
*G01B 11/06* (2006.01)

(52) U.S. Cl.
CPC .......... *B05C 11/00* (2013.01); *B05C 11/1002* (2013.01); *B05C 11/1015* (2013.01); *G01B 11/14* (2013.01); *G01C 15/004* (2013.01); *G01B 11/0608* (2013.01); *Y10T 29/49* (2015.01)

(56) References Cited

U.S. PATENT DOCUMENTS

| | | | |
|---|---|---|---|
| 5,959,731 | A | 9/1999 | Jones |
| 6,540,152 | B2 | 4/2003 | Holm et al. |
| 6,749,688 | B2 | 6/2004 | Tateyama et al. |
| 6,955,946 | B2 | 10/2005 | Bouras et al. |
| 6,991,825 | B2 | 1/2006 | Hui et al. |
| 7,540,924 | B2 | 6/2009 | Ahn et al. |
| 7,889,342 | B2 | 2/2011 | Hellstrom et al. |
| 8,760,666 | B2 | 6/2014 | Heinisch et al. |
| 2003/0017257 | A1 | 1/2003 | Birmingham |
| 2003/0209560 | A1 | 11/2003 | Hui et al. |
| 2005/0269375 | A1 | 12/2005 | Ahn et al. |
| 2006/0068083 | A1 | 3/2006 | Moon et al. |
| 2009/0078720 | A1 | 3/2009 | Abernathy et al. |
| 2009/0231368 | A1 | 9/2009 | Nakano et al. |

FOREIGN PATENT DOCUMENTS

| | | |
|---|---|---|
| CN | 101868689 A | 10/2010 |
| EP | 2517798 A1 | 10/2012 |
| JP | S6311806 A | 1/1988 |
| JP | 3254574 B2 | 2/2002 |

OTHER PUBLICATIONS

Asymtek, a Nordson Company, Specifications of Laser Height Sensor, May 19, 2006, 2 pages.

Asymtek: "S-820B Dispensing system—Quick Operations Manual", Dec. 31, 2008, Retrieved from the Internet: URL:http://www.nordson.com/en-us/divisions/asymtek/documents/manuals/7218912_A.pdf [retrieved on May 28, 2014].

European Patent Office, International Search Report and Written Opinion issued in International application No. PCT/US2014/012889 dated Jun. 11, 2014.

USPTO, Office Action issued in U.S. Appl. No. 13/769,605 dated Jun. 10, 2014.

USPTO, Notice of Allowance issued in U.S. Appl. No. 13/769,605 dated Oct. 22, 2014.

AUTOMATED POSITION LOCATOR FOR A HEIGHT SENSOR IN A DISPENSING SYSTEM

CROSS-REFERENCE TO RELATED APPLICATIONS

This application is a divisional of U.S. patent application Ser. No. 13/769,605, filed Feb. 18, 2013, and issued as U.S. Pat. No. 8,944,001 on Feb. 3, 2015, the disclosure of which is incorporated by reference in its entirety.

TECHNICAL FIELD

The invention relates generally to an apparatus and methods for dispensing fluid materials and, more particularly, to an apparatus and methods for determining the position of a height sensor relative to a dispenser in a dispensing assembly.

BACKGROUND

Fluid dispensers are commonly used in the electronics industry to selectively dispense minute amounts or droplets of a highly viscous fluid material onto an electronic substrate, such as circuit board. The types of dispensers commonly used for this purpose include needle, spray, and jetting dispensers. The dispensing valve, or dispenser, that applies the fluid materials is typically part of a dispensing assembly that includes a camera and a height sensor. To dispense fluid materials, the dispensing assembly is moved by a robot, such as an x-y positioner, in a pattern across a surface of the circuit board that bears the components. To provide accurate dispensing, both the horizontal position on an x-y grid and the height (z) of the dispenser must be accurately known so that fluids are dispensed at desired locations on the circuit board, and to prevent unwanted contact between the dispenser and circuit board components. Thus, it is necessary to know the position of the dispenser relative to the locations on the circuit board where the fluid material is to be deposited.

X-Y Offset Calibration Using Contact Height of the Prior Art

When dispensing droplets of material such as adhesive onto a substrate to attach components to the substrate, or underfill components on the substrate, it is necessary to know the x-y-z positions of the components on the substrate, or more precisely, the x-y-z positions of the surfaces on the substrate, or on the components, where material is to be dispensed. To determine these x-y-z positions, a camera and a height sensor ride along with the dispenser on the x-y robot in the system. The x-y positions of the components are then determined based on images from the camera, and the z positions are determined from a height sensor as the camera and height sensor are moved across the substrate. The dispenser is carried on a z-head that moves the dispenser up-and-down.

More specifically, the system uses the camera produce an x-y map of the components by moving the camera over the components on the substrate. The system then likewise moves the height sensor over the components of the substrate and, together with the camera-height sensor offset (described below), produces an x-y-z topographical map of the part/substrate. Given this topographical map, and the camera-dispenser valve offset (described below), the system can dispense at the desired x-y locations and the desired distance z above the substrate. By dispensing at the desired distance z above the substrate, the system can ensure that the dispenser does not contact any of the components on the substrate and travels at the proper process height for dispensing.

Referring to FIG. 1, the camera-dispenser offset is determined as follows. An area known as a "service station" is provided off to the side of the x-y robot where calibration and other functions are performed. The service station has a calibration surface 1 that is used to calibrate the position of the dispenser. The dispensing assembly is moved over the calibration surface 1 to an x-y position 2, and the x-y coordinates of the position 2 recorded by recording the encoder counts of the X and Y drives with the dispensing assembly at position 2. For example, the X drive encoder count might be 500 and the Y drive encoder count might be 1000 so that the (x, y) coordinates of position 2 would be (500, 1000). The dispenser then dispenses a droplet of material onto the calibration surface 1 with the dispensing assembly in the x-y position 2. The camera is then moved over the droplet of material so that the crosshairs of the camera are centered on the droplet. The x-y coordinates of the x-y position 3 of the dispensing assembly are then recorded with the camera centered on the droplet. The recorded x-y position 3 with the camera centered on the droplet might be (600, 1200), for example. Thus, the crosshairs of the camera in the example are spaced some distance in x and y away from the centerline of the dispenser. The difference between the x-y positions 2, 3 of the dispensing assembly with the dispenser in the calibration position and the camera in the calibration position, using the camera as a reference position, is a camera-dispenser offset vector 4. In this case, the camera-dispenser offset vector 4 would be (500-600, 1000-1200) or (−100, −200). Each encoder count might be equal to 1 mm in distance, for example. Therefore, in this example, the dispenser is located 100 mm to the left of the camera on the X axis and 200 mm "below" the camera on the Y axis, so the offset vector is (−100 mm, −200 mm).

Referring now to FIG. 2, the camera-height sensor offset vector can be determined as follows. In the past, a contact type height sensor was used which had a small probe that contacted the substrate to determine the height of the substrate. U.S. Pat. No. 6,955,946 describes a prior art contact type height sensor at column 4, lines 48-64. With this type of height sensor, the dispensing assembly is moved to position the height sensor probe above the calibration surface 1. The height sensor is then lowered to make an indentation, or calibration mark in a deformable solid on the calibration surface 1, and the x-y position 5 of the dispensing assembly is recorded. For example, the position 5 of the dispensing assembly during formation of the calibration mark may be determined to be (800, 1600). Then, the camera is moved over the calibration mark so that the crosshairs of the camera are centered on the calibration mark, and the x-y position 6 of the dispensing assembly recorded. In this example, the x-y position 6 of the dispensing assembly when the camera is aligned with the calibration mark is (1100, 1700). The difference between the x-y positions 5, 6 of the dispensing assembly with the height sensor in the calibration position and the camera in the calibration position, again using the camera as the reference point, is (800-1100, 1600-1700,) or (−300, −100), which is the camera-height sensor offset vector 7.

Referring now to FIG. 3, in some systems it may also be desirable to know the offset vector between the height sensor and the dispenser, or height sensor-dispenser offset vector 8. The height sensor-dispenser offset vector 8 can be determined from the camera-dispenser offset vector 4 and the camera-height sensor offset vector 7 by determining the difference between the vectors 4, 7. For example, having determined that the camera-dispenser offset vector 4 is (−100, −200), and the camera-height sensor offset vector 7 is (−300, −100), the offset vector between the height sensor and the dispenser, using the dispenser as a reference, can be determined from those two offset values as (−300-(−100), −100-(−200)) or (−200, 100). The x-y-z topographical map, which includes coordinates of all the component locations that were determined using the camera and the height sensor as previously described, is then used with the camera-dispenser offset vector 4, and optionally the height sensor-dispenser offset vector 8, to dispense materials at desired locations on the substrate and from the proper height above the substrate.

X-Y Offset Calibration Using Laser Height Sensor of the Prior Art

It was eventually determined that using a height sensor which makes contact with the substrate is undesirable, so more recently noncontact height sensors such as laser height sensors have been used in the art. Referring now to FIG. 4, the laser height sensor 9 uses a triangulation method to determine substrate height. To this end, a laser beam 11 is projected down to the target surface 13. A beam 15 is then reflected back to the sensor 9 from the target surface 13. The reflected beam 15 is focused through a receiver lens 17 and projected onto a Charge Coupled Device (CCD) 19 within the sensor 9. The CCD 19 detects the peak value of the laser light distribution of the reflected beam 15 for each pixel and determines the precise target 13 position. As the target displacement changes relative to the sensor 9, the position of the reflected beam 15 changes on the CCD 19. Measurement of the position of the reflected beam 15 on the CCD 19 thereby provides stable and accurate height sensing on a variety of target surface types.

To determine the camera-height sensor offset vector when a laser height sensor is used, a calibration mark is placed on the service station calibration surface, and the laser beam spot is manually (i.e. visually) centered on the calibration mark. After the laser height sensor has been manually positioned in this way, the (x, y) coordinates of the sensor are recorded and the camera-height sensor offset vector is determined in the same way as described above for a contact height sensor. However, this method has two problems. The first problem is that relying on an operator to manually position the laser spot on the calibration mark introduces human error in that one must visually judge when the laser spot, which is very tiny, is centered on the calibration mark. This can result in errors of a hundred microns or more off of the true center of the calibration mark. Given the high level of precision needed in the electronics industry when dispensing tiny dots of material on small components, being 100 microns or more off target when dispensing a dot of material can be unacceptable. The second problem is that the current method is stressful on the eyes of the operator given that the operator must look at a bright laser light. This stress on the operator can cause even more inaccuracy when visually positioning the laser on the calibration mark.

Therefore, improved apparatuses and methods for determining the position of a noncontact height sensor, such as a laser height sensor, are needed. These improved apparatuses and methods should be more accurate and less stressful on the operator, or remove the need for an operator to perform the noncontact height sensor alignment task. By positioning the height sensor more accurately, a more accurate topographical map of the components on the substrate can be created, which will enable the system to more accurately dispense materials onto the substrate.

SUMMARY

In one embodiment, an apparatus includes a height sensor configured to emit electromagnetic radiation, a dispensing valve configured to dispense a material on a substrate, and a camera. A positioner is configured to support the height sensor, the camera, and the dispensing valve and to move the height sensor, the camera, and the dispensing valve as an assembly relative to the substrate. The apparatus further includes a controller in communication with the positioner, the height sensor, the dispensing valve, and the camera, and a service station including a calibration device configured to receive the electromagnetic radiation emitted from the height sensor and to cause an alignment signal to be communicated to the controller when the electromagnetic radiation is received by the calibration device.

In another embodiment, a method of determining a position of a height sensor in a dispensing system is presented. The method includes moving the height sensor relative to a calibration device in order to align electromagnetic radiation emitted by the height sensor with the calibration device. In response to receipt of the electromagnetic radiation emitted by the height sensor, an alignment signal is generated with the calibration device. The method further includes determining a position in a plane of the height sensor in response to generating the alignment signal.

BRIEF DESCRIPTION OF THE DRAWINGS

The accompanying drawings, which are incorporated in and constitute a part of this specification, illustrate various embodiments of the invention and, together with the general description of the invention given above and the detailed description of the embodiments given below, serve to explain the embodiments of the invention.

DETAILED DESCRIPTION

Embodiments of the invention are directed to an apparatus and method for automatically determining the relative positions of a dispensing valve and a height sensor in a dispensing assembly. The apparatus includes a calibration device that causes an alignment signal to be generated in response to electromagnetic radiation from the height sensor being aligned with the calibration device and in a non-contacting relationship with the calibration device. In one embodiment, the calibration device includes an optical sensor that generates the alignment signal in response to receipt of a light beam emitted by a laser in the height sensor. In another embodiment, the calibration device includes a fiducial feature having a detectable height change, and the height sensor generates the alignment signal in response to detecting the height change. In either embodiment, the absolute position of the height sensor in a horizontal, or x-y reference plane is determined in response to the alignment signal indicating that the electromagnetic radiation from the height sensor is aligned with the calibration device. The position of the height sensor relative to a camera in the same x-y reference plane, or camera-height sensor "offset vector" between the height sensor and camera may then be determined by selectively positioning the calibration device in a field of view of the camera. The camera-height sensor offset vector may be determined by aligning the crosshairs of the camera with the calibration device and recording the (x, y) coordinates (e.g., (x, y) encoder counts) corresponding to the position of the dispensing assembly. After recording the position of the dispensing assembly, the height sensor may be aligned with the calibration device, and the (x, y) coordinates of the new position of the dispensing assembly recorded. The coordinates of these two positions can then be compared to determine the camera-height sensor offset vector similarly as described above with respect to contact and laser height sensors. The camera-dispenser offset vector can then be determined as described above. This camera-height sensor offset is then used to more accurately dispense materials onto electronic substrates than was possible with previous visually, or manually, aligned height sensors. The position of the height sensor relative to a dispensing valve, or height sensor-dispenser offset vector, may also be determined as another set of offset coordinates based on the camera-height sensor and the camera-dispenser offset vectors if desired.

Figure 5:
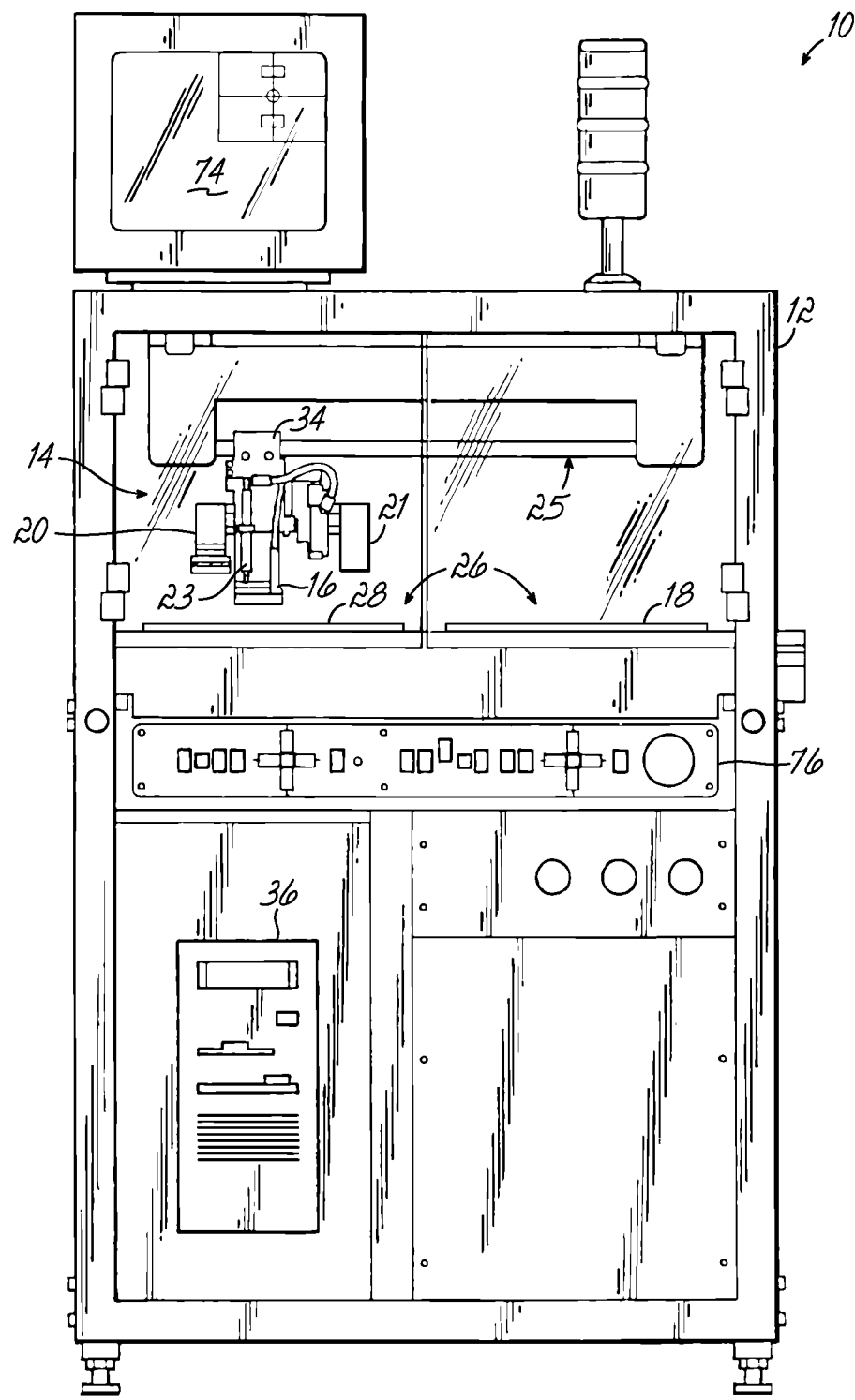
FIG. 5 is a diagrammatic view of a fluid material dispensing system in accordance with an embodiment of the invention.
Figure 6:
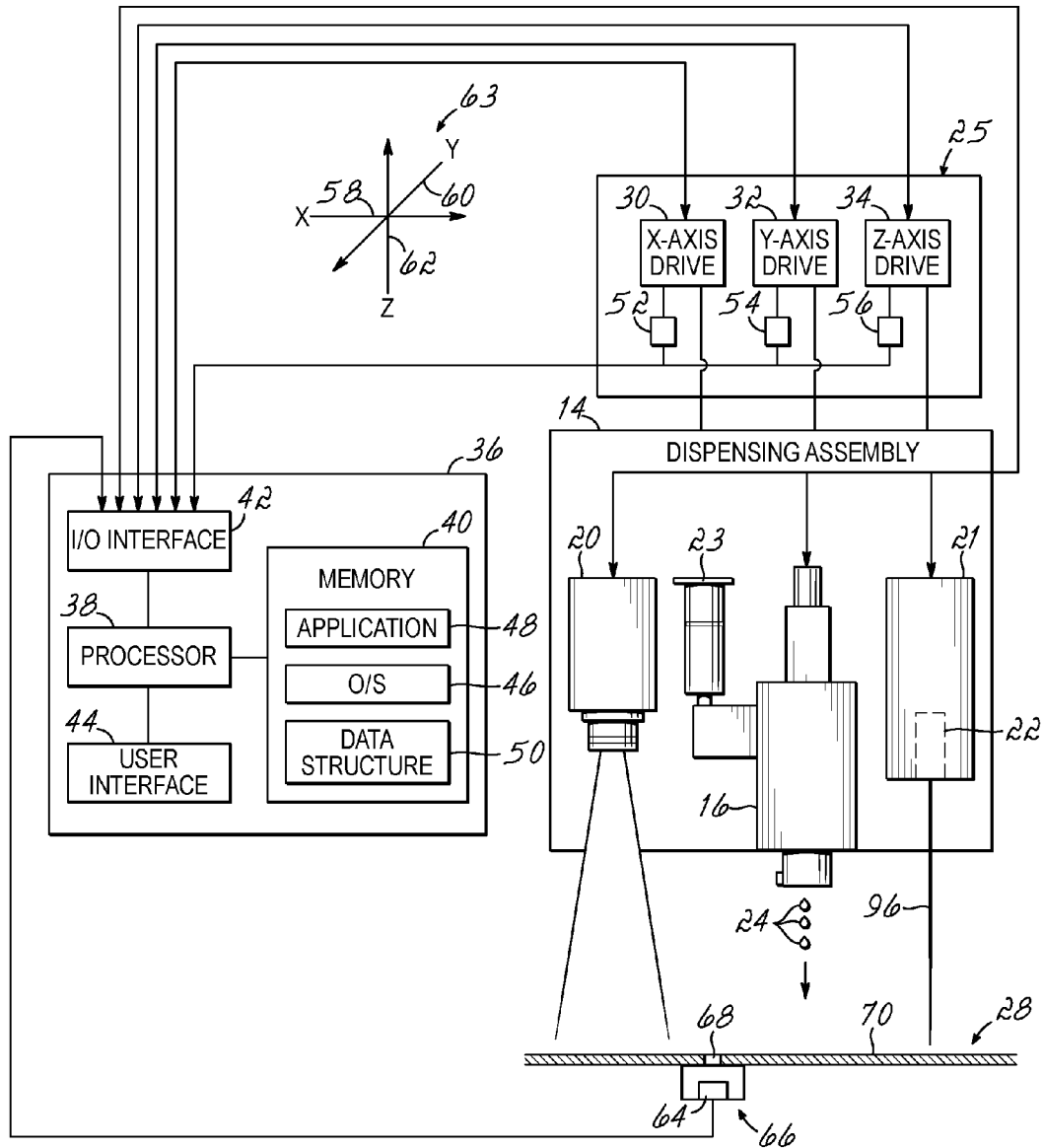
FIG. 6 is a schematic view of the fluid material dispensing system of FIG. 5 illustrating a controller, a dispensing assembly having a camera and a height sensor, and a service station having a calibration device.

With reference to FIGS. 5 and 6, a material dispensing system 10 includes a cabinet 12, which in the illustrated embodiment comprises a framework of interconnected horizontal and vertical beams partially covered by panels, and a dispensing assembly 14. The dispensing assembly 14 includes a dispensing valve 16 for selectively dispensing controlled amounts of a fluid material onto a substrate 18, such as a circuit board. The dispensing assembly also includes a camera 20 and a height sensor 21. The height sensor 21 may include a laser 22. Dispensing valve 16 may be a needle dispenser, a spray dispenser, a jetting dispenser, or any other device suitable for dispensing fluids such as adhesives, epoxies, or solder pastes onto the substrate 18 from a fluid material reservoir 23. In embodiments with a jetting dispenser valve, the fluid material may be dispensed as one or more droplets 24 of the fluid material. The dispensing assembly 14 is coupled to a positioner 25 configured to selectively position the dispensing assembly 14 above a working area 26 that includes the substrate 18 and a service station 28. The positioner 25 may be an a three-axis positioner that includes independently controllable x-axis and y-axis drives 30, 32 configured to move the dispensing assembly in a horizontal plane above the working area 26, and a z-axis drive 34 configured to adjust the height of the dispensing assembly 14 and/or dispensing valve 16 relative to the working area 26. The positioner 25 may thereby provide three substantially perpendicular axes of motion for the dispensing assembly 14. Although the dispensing assembly 14 is shown in the illustrated embodiment as being coupled to an x-y positioner by a z-axis drive, persons having ordinary skill in the art will understand that other mechanisms could be used to position the dispensing assembly 14. For example, the positioner 25 could be a motorized arm having a plurality of single axis rotational joints.

Referring now to FIG. 6, the dispensing system 10 includes a controller 36, which may be a computer mounted in the cabinet 12. The controller 36 may be configured to provide for the overall control for the dispensing system 10 by coordinating movements of the dispensing assembly 14 and actuations of the dispensing valve 16. The controller 36 includes a processor 38, a memory 40, an input/output (I/O) interface 42 and a user interface 44. The processor 38 may include one or more devices selected from microprocessors, micro-controllers, digital signal processors, microcomputers, central processing units, field programmable gate arrays, programmable logic devices, state machines, logic circuits, analog circuits, digital circuits, or any other devices that manipulate signals (analog or digital) based on operational instructions that are stored in the memory 40. Memory 40 may be a single memory device or a plurality of memory devices including but not limited to read-only memory (ROM), random access memory (RAM), volatile memory, non-volatile memory, static random access memory (SRAM), dynamic random access memory (DRAM), flash memory, cache memory, or any other device capable of storing digital information. Memory 40 may also include a mass storage device (not shown) such as a hard drive, optical drive, tape drive, non-volatile solid state device or any other device capable of storing digital information.

Processor 38 may operate under the control of an operating system 46 that resides in memory 40. The operating system 46 may manage controller resources so that computer program code embodied as one or more computer software applications, such as a controller application 48 residing in memory 40 may have instructions executed by the processor 38. In an alternative embodiment, the processor 38 may execute the applications 48 directly, in which case the operating system 46 may be omitted. One or more data structures 50 may also reside in memory 40, and may be used by the processor 38, operating system 46, and/or controller application 48 to store or register data, such as system calibration parameter or position coordinate values.

The I/O interface 42 operatively couples the processor 38 to other components of the dispensing system 10, including dispensing valve 16, camera 20, height sensor 21, as well as x-axis, y-axis and z-axis drives 30, 32, 34. The I/O interface 42 may also couple the processor 38 to an x-axis encoder 52, a y-axis encoder 54, and a z-axis encoder 56. The encoders 52, 54, 56 may provide signals to the controller 36 indicative of the position of the dispensing assembly 14 in each of three generally perpendicular axes of motion 58, 60, 62 comprising a Cartesian coordinate frame 63. To this end, the encoders 52, 54, 56 may generate signals that reflect operation of the respective one of the axis drives 30, 32, 34. In an embodiment of the invention, the encoders may indicate the position in which they have moved dispensing assembly 14 by an encoder count. For example, in a system for which an encoder count may represent 1 mm in distance, an encoder count of 1000 for the x drive encoder would indicate that the encoder has moved the height sensor to a position which is 1000 mm from the count 0 reference point for the encoder. In this case, the signal from the encoder for the x drive would represent an encoder count of 1000.

The I/O interface 42 may also be coupled to an optical sensor 64 that is part of a height sensor position calibration device 66. The calibration device 66 may be located in the service station 28 to provide a fixed positional reference for calibrating the relative positions of the camera 20 and height sensor 21 (i.e., the camera-height sensor offset vector). The calibration device 66 may thereby be used to determine the camera-height sensor offset vector between the camera 20 and height sensor 21. In an embodiment of the invention, the optical sensor 64 may be mounted beneath an aperture 68 in a surface 70 of service station 28, and may include a light sensitive element, such as a photo diode, photo transistor, or Charge Coupled Device (CCD). In an embodiment of the invention, the calibration device 66 may also include a fiducial feature having a step change in height sufficient to be detected by the height sensor 21. This fiducial feature may be provided by the aperture 68, or by a raised feature 72 (FIG. 7D) that extends vertically from the surface 70 of service station 28. In embodiments having the fiducial feature 68, 70, the optical sensor 64 may be omitted.

The I/O interface 42 may include signal processing circuits that condition incoming and outgoing signals so that the signals are compatible with both the processor 38 and the components to which the processor 38 is coupled. To this end, the I/O interface 42 may include analog-to-digital (A/D) and/or digital-to-analog (D/A) converters, voltage level and/or frequency shifting circuits, optical isolation and/or driver circuits, and/or any other analog or digital circuitry suitable for coupling the processor 38 to the other components of the dispensing system 10.

The user interface 44 may be operatively coupled to the processor 38 of controller 36 in a known manner to allow a system operator to interact with the controller 36. The user interface 44 may include a display 74 and a control panel 76 (FIG. 5). The display 74 may include a video monitor, alphanumeric displays, a touch screen, a speaker, and any other suitable audio and visual indicators capable of providing information to the system operator. The control panel 76 may include input devices and controls such as an alphanumeric keyboard, a pointing device, keypads, push-buttons, control knobs, microphones, etc., capable of accepting commands or input from the operator and transmitting the entered input to the processor 38. In this way, the control panel 76 may enable manual initiation of system functions, for example, during set-up, calibration, and fluid material loading.

The controller application 48 may be configured to selectively activate the axis drives 30, 32, 34 to move the dispensing assembly 14 over the working area 26 in the three-dimensional Cartesian coordinate frame 63. The controller application 48 may also determine the position of the dispensing assembly 14 with high precision based on signals received from the axis encoders 52, 54, 56, and selectively activate the dispensing valve 16 to dispense fluid material in a desired manner based on operational instructions stored in memory 40. The dispensing assembly 14 and/or dispensing valve 16 may be raised and lowered using the z-axis drive mechanism 34 to dispense fluid material from various heights above the working area 26, or to clear components mounted on the substrate 18.

The dispensing valve 16, camera 20, height sensor 21 move together as a unit with the dispensing assembly 14. The camera 20 includes a suitable imaging device, such as a CCD, and may also include a light source (not shown) configured to illuminate a region of the work area being imaged. The camera 20 has a field of view representing an area of inspection captured on the camera's imager. As the positioner 25 moves the dispensing assembly 14 relative to the substrate 18 and service station 28, the area covered by the field of view of the camera 20 changes. The camera 20 and height sensor 21 are operatively coupled to the processor 38 via the I/O interface 42. The I/O interface 42 may provide power to the camera 20 and height sensors 21, as well as communicate signals representing images captured by the camera 20 and/or data transmitted by the height sensor 21 to the processor 38. The controller application 48 may determine the height of the height sensor 21 above the substrate 18, components on the substrate, and service station 28 based on height data received from the height sensor 21.

Figure 7A:
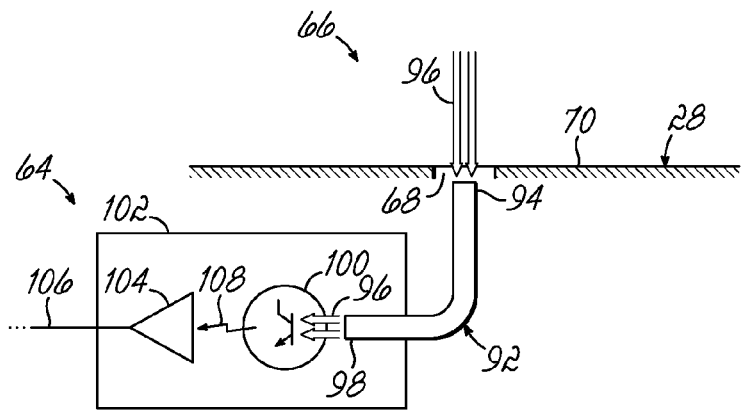
FIGS. 7A-7D are diagrammatic views illustrating details of various embodiments of the calibration device from FIG. 6.
Figure 7B:
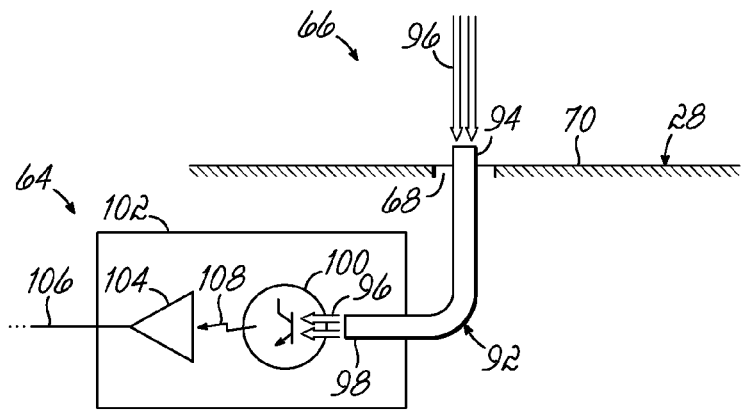

Referring now to FIGS. 7A and 7B, the calibration device 66 may include the optical sensor 64 positioned generally below the aperture 68. The optical sensor 64 may be any suitable sensor that detects light emitted from the laser 22 of height sensor 21. The optical sensor 64 may include an optical fiber 92 having a first end 94 configured to receive a light beam 96 from the laser 22, and a second end 98 that optically couples the light beam 96 to a photosensitive device 100 of an optical receiver 102.

As best illustrated in FIG. 7A, the first end 94 of optical fiber 92 may be positioned below the aperture 68. However, in alternative embodiments, the first end 94 of optical fiber 92 may extend through the aperture 68 so that the first end 94 is level with or extends above the surface 70 of service station 28, as shown in FIG. 7B. Persons having ordinary skill in the art will therefore understand that embodiments of the invention are not limited to a particular location of the first end 94 of optical fiber 92, or even an optical sensor 64 that includes an optical fiber 92. For example, the optical sensor 64 may be configured so that the photosensitive device 100 receives the light beam 96 directly from the height sensor 21 without the optical fiber 92. For example, in an alternative embodiment, the photosensitive device 100 could be positioned in the aperture 68.

The optical fiber 92 may be formed of any suitable optically transparent material, such as glass, and is configured to capture the light beam 96 incident on the first end 94 and couple this captured light beam 96 through the fiber 92 to the optical receiver 102. The optical receiver 102 may include the photosensitive device 100 and an amplifier 104 having an output 106 that is coupled to the I/O interface 42 of controller 36. The photosensitive device 100 may be a photodiode, a phototransistor, a CCD, or any other suitable device that converts the received light beam 96 into an electrical signal 108 that is provided to the amplifier 104 of optical receiver 100. The optical receiver 100 may be configured so that the signal at the output 106 of amplifier 104 has an amplitude which corresponds to an intensity of the light beam 96. That is, the output 106 of amplifier 104 may be an analog signal having a voltage or current level corresponding to the intensity of the light incident on the first end 94 of optical fiber 92. In an alternative embodiment of the invention, the optical receiver 102 may include a comparator or multi-bit A/D converter (not shown) that converts the electrical signal 108 into a digital signal having one or more data bits that are transmitted to the controller 36 via the I/O interface 42.

Figure 7C:
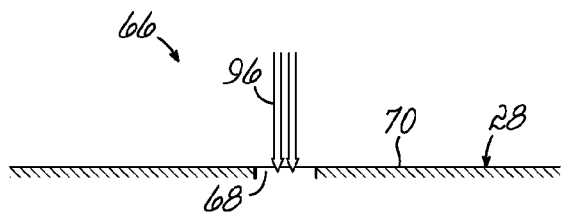
Figure 7D:
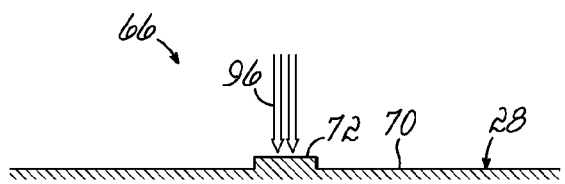

Referring now to FIGS. 7C and 7D, in an alternative embodiment of the invention, the calibration device 66 may include a fiducial having an edge that provides a step change in the distance between the surface 70 of service station 28 and the height sensor 21. This fiducial may comprise an opening, such as the aperture 68 shown in FIG. 7C, or the raised feature 72 shown in FIG. 7D. The step change in height provided by the fiducial may be detected by the height sensor 21 when the height sensor 21 is in a position that causes the light beam 96 to be incident on the aperture 68 or raised feature 72, as the case may be. Embodiments of the invention having a calibration device 66 that includes a fiducial with a step height change may thereby allow the position of the height sensor 21 to be determined based on an alignment signal generated by the height sensor 21 in response to detecting the fiducial. Embodiments of the invention including the fiducial having the step height change may therefore omit the optical sensor 64.

Figure 8:
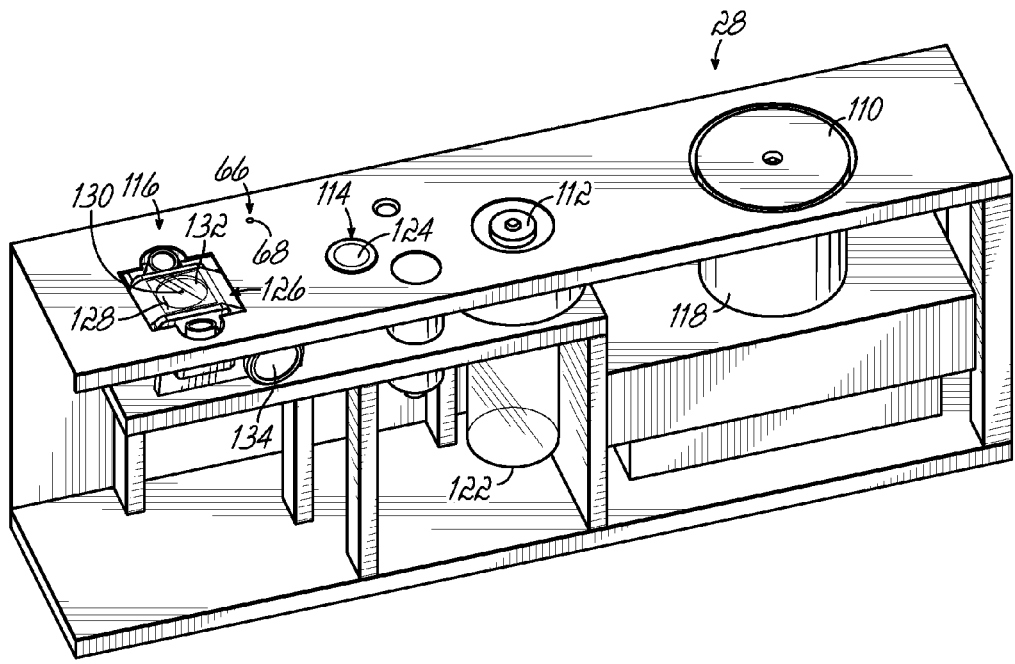
FIG. 8 is a perspective view of the service station of FIG. 6 illustrating the calibration device and a camera position calibration station that includes a dispenser reel.

Referring now to FIG. 8, a perspective view of an embodiment of the service station 28 is presented showing the calibration device 66, a weighing station 110, a purge station 112, a z-height calibration station 114, and a camera position calibration station 116. The weighing station 110 includes a scale 118 configured to receive one or more droplets 24 of fluid material from the dispensing valve 16. The scale 118 weighs the droplets 24 and provides information related to the mass of material deposited in the scale 118 so that the dispensing system 10 may calibrate the amount of fluid material deposited by the dispensing valve 16. The purge station 112 may include a reservoir 122 configured to receive waste material purged from the dispensing valve 16.

The z-height calibration station 114 includes a pressure sensitive region 124, which may be comprised of a z-height switch (not shown) configured to provide a signal to the controller 36 in response to contact by the dispensing valve 16. To calibrate the height of the dispensing valve 16 relative to the height of the height sensor 21, the dispensing assembly 14 may be positioned so that the height sensor 21 is above the pressure sensitive region 124 of calibration station 114. The distance between the height sensor 21 and the pressure sensitive region 124 is then determined using the height sensor 21, and the determined height registered in memory 40 by the controller application 48. The dispensing assembly 14 may then be repositioned so that the dispensing valve 16 is above the pressure sensitive region. The dispensing valve 16 may then be lowered by the z-axis drive 34 until the valve 16 contacts the pressure sensitive region 124, thereby activating the z-height switch. In response to activation of the z-height switch, the controller application 48 may determine the z-axis position of the dispensing valve 16 based on signals received from the z-axis encoder 56. The z-axis offset between the dispensing valve 16 and the height sensor 21 may then be determined based on the current z-axis position of the dispensing valve 16, and the registered height of the height sensor 21 in memory 40.

Figure 8A:
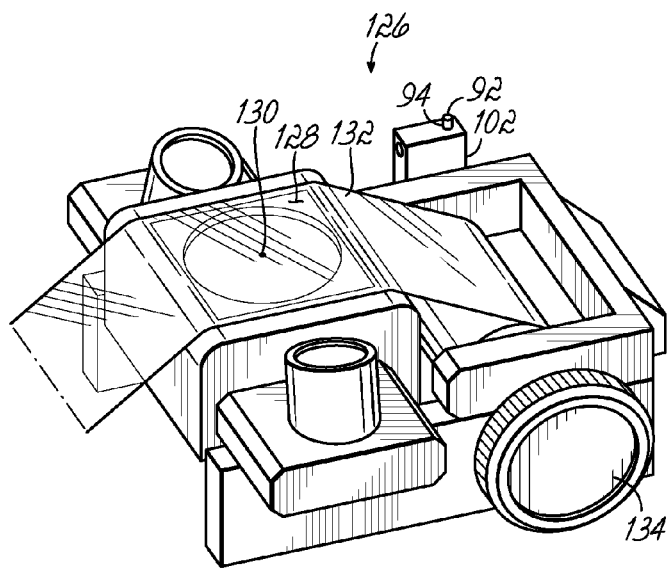
FIG. 8A is a perspective view of the dispenser reel of FIG. 8.

Referring now to FIG. 8A with continued reference to FIG. 8, the camera position calibration station 116 may include a dispensing reel 126 configured to provide a clean calibration surface 128 for receiving a calibration dot 130. To calibrate the position of the dispensing valve 16 relative to the camera 20, the controller application 48 may cause the dispensing reel 126 to advance a film strip 132 by rotating a bobbin 134. The clean calibration surface 128 may thereby be provided by a fresh section of the film strip 132. The controller application 48 may then position the dispensing valve 16 over the calibration surface 128 with the positioner 25 and register the x-axis and y-axis coordinates of the dispensing assembly 14. A droplet 24 of fluid material may then be discharged from the dispensing valve 16 to form the calibration dot 130 on the calibration surface 128 below the dispensing valve 16. The controller application 48 may then move the dispensing assembly 14 so that the calibration dot 130 is within the field of view of the camera 20. Based on images provided by the camera 20, the controller application 48 may fine tune the position of the dispensing assembly 14 until a predefined location in the field of view of the camera 20, such as a crosshairs, or other reticule 136 (FIG. 9) is aligned with the calibration dot 130. The current x-axis and y-axis coordinates (i.e. encoder counts) of the dispensing assembly 14 may then be compared to the registered coordinates (i.e. encoder counts) obtained from the x-axis and y-axis encoders 52, 54 when the calibration dot 130 was deposited to determine the relative position of the dispensing valve 16 to the camera 20. These coordinates (i.e. encoder counts) are then utilized to determine the camera-dispenser offset vector as previously described.

Figure 9:
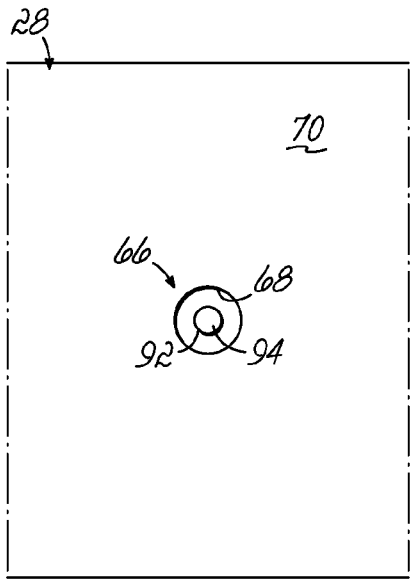
FIG. 9 is a top view of the calibration device at the service station of FIG. 8.
Figure 9A:
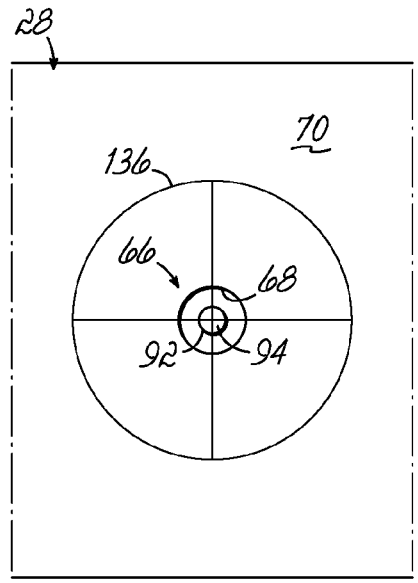
FIG. 9A is diagrammatic view of the calibration device of FIG. 9 as seen in the field of view of the camera.

FIG. 9 illustrates an enlarged top view of the surface 70 of service station 28 in the vicinity of the calibration device 66 showing the aperture 68 and the first end 94 of optical fiber 92. FIG. 9A illustrates an exemplary view through the camera 20 of the area of the service station 28 shown in FIG. 9 while the camera 20 is positioned over the calibration device 66 showing the reticule 136 aligned with the aperture 68 and the first end 94 of optical fiber 92. Although the first end 94 of optical fiber 92 is shown as being visible in FIG. 9A, it should be understood that in some embodiments of the invention, the first end 94 of optical fiber 92 may not be visible through the camera 20. For example, the first end 94 of optical fiber 92 may be positioned sufficiently below the aperture 68 so that the first end 94 is not visible in images captured by the camera 20. In the case where the first end 94 of optical fiber 92 is not visible, the reticule 136 may simply be aligned with the aperture 68.

To calibrate the position of the camera 20 relative to the height sensor 21, the controller application 48 positions the camera 20 over the calibration device 66. Similarly as described with respect to the calibration dot 130, the controller application 48 moves the camera 20 until its crosshairs are aligned with the calibration device 66 based on images obtained from the camera 20. The x-y position of the dispensing assembly 14 may then be determined from the x and y encoder drives while the crosshairs are aligned with the calibration device 66. The controller application 48 then records the x-coordinate and y-coordinate respectively obtained from the x-axis and y-axis encoders 52, 54 in memory 40.

Figure 10:
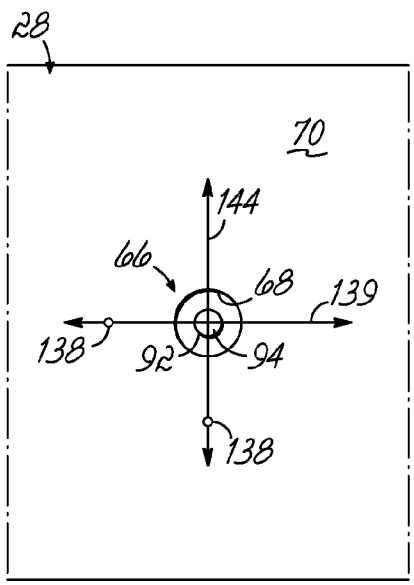
FIG. 10 is a top view of the calibration device with the beam spot of the height sensor incident on the top surface of the service station.

FIG. 10 illustrates a top view of the calibration device 66 while the height sensor 21 is positioned over the calibration device 66. In this position, a laser dot 138 may be projected onto the surface 70 of service station 28 by the laser 22 of height sensor 21. To determine the coordinates that align the height sensor 21 with the calibration device 66, the controller application 48 may move the dispenser assembly 14 (and thus by extension the height sensor 21) so that the laser dot 138 moves across the calibration device 66 along a first axis 139 (e.g., the x-axis) and passes across the aperture 68. The laser light that passes through the aperture 68 may be captured by the first end 94 of optical fiber 92 and transmitted to the optical receiver 102 as the laser dot 138 passes over the calibration device 66.

Figure 11:
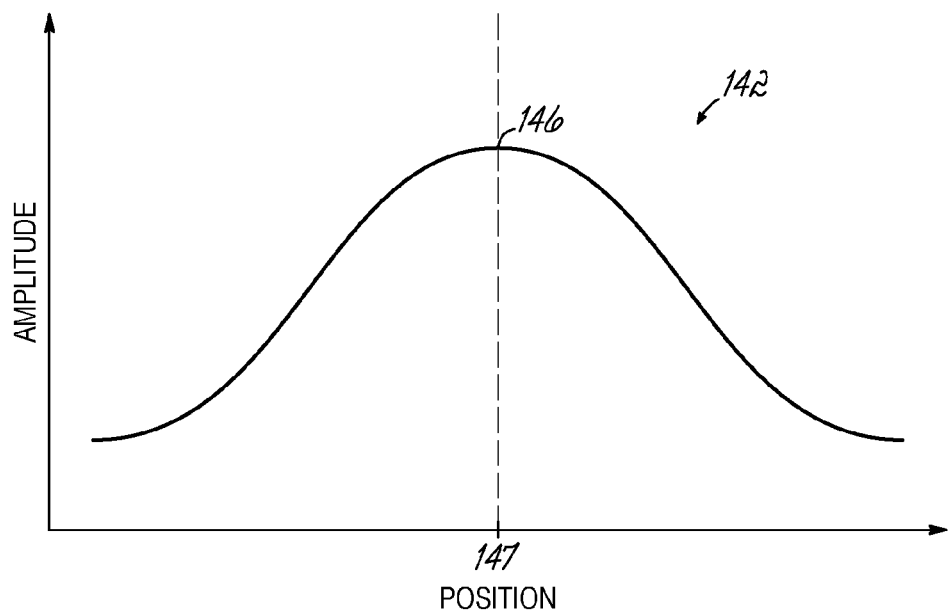
FIG. 11 is a plot illustrating an alignment signal generated by the calibration device in FIG. 6.

Referring now to FIG. 11 and with continued reference to FIG. 10, a plot of an alignment signal 142 generated by the optical sensor 64 shows an exemplary relationship between the amplitude of the alignment signal 142 and the position of the laser dot 138 along the first axis 139. In response to receiving the captured light, the optical receiver 102 transmits the alignment signal 142 to the controller 36. In an embodiment of the invention, the controller application 48 first determines the position of the height sensor 21 when the laser dot 138 is centered along the first axis 139 (e.g., the x-axis 58) by means of the following three steps: (1) the controller 48 obtains x-coordinates from the encoder 52 as the laser dot 138 is moved across the calibration device 66; (2) the controller 48 determines a maximum 146 of the signal 142; and (3) the controller 48 registers a coordinate 147 (e.g., the output of the x-axis encoder 52, hereinafter referred to as the "sensor x-coordinate") of the first axis 139 corresponding the maximum 146 of alignment signal 142. This sensor x-coordinate is then used to position the dispenser so that the laser dot 138 is aligned with the second axis 144 as shown in FIG. 10.

Using the sensor x-coordinate as the first axis coordinate corresponding to the crossing point of the second axis 144, the controller 48 next determines the position of the height sensor 21 when the laser dot 138 is centered along the second axis 144 (e.g., the y-axis 60) by means of the following three steps: (1) the controller 48 obtains y-coordinates from the encoder 54 as the laser dot 138 is moved across the calibration device 66; (2) the controller 48 determines a maximum value of the signal, and (3) the controller 48 registers a coordinate (e.g., the output of the y-axis encoder 54, hereinafter referred to as the "sensor y-coordinate") of the second axis 144 corresponding the maximum value of the alignment signal. These two coordinates, the sensor x-coordinate and the sensor y-coordinate, comprise the coordinates of the dispensing assembly 14 when the height sensor 21 is aligned with the calibration device 66.

Having determined the coordinates of the dispensing assembly 14 when the height sensor 21 is aligned with the calibration device 66, the crosshairs of the camera are then centered over, or aligned with, the calibration device 66, and the coordinates of the dispensing assembly 14 with the camera in this aligned position are recorded. The camera-height sensor offset vector is then determined from the recorded dispensing assembly coordinates as previously described.

Figure 12:
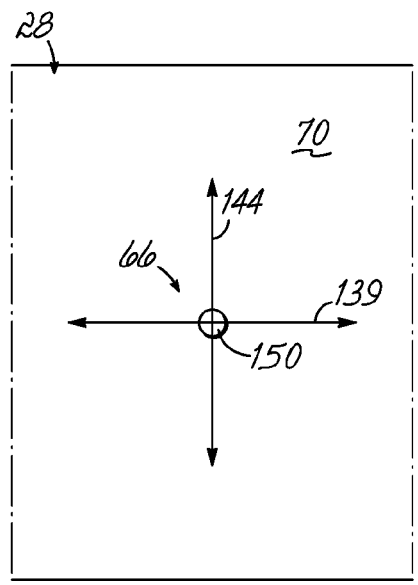
FIG. 12 is a top view of the calibration device in an alternative embodiment of the invention.
Figure 13:
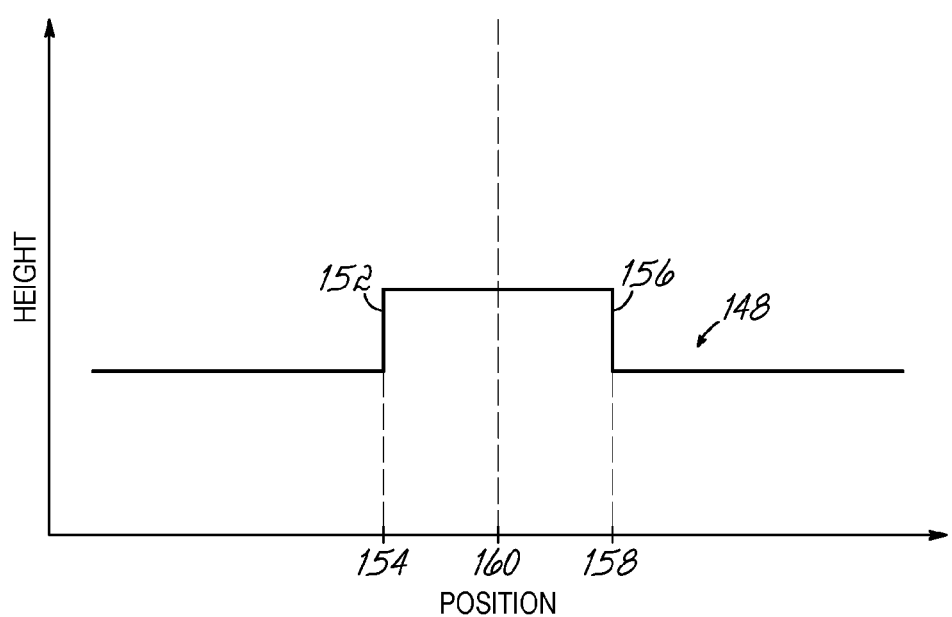
FIG. 13 is a plot illustrating an alignment signal generated by the height sensor in response to interaction with the calibration device of FIG. 12.

Referring now to FIGS. 12 and 13, in an alternative embodiment of the invention, the controller application 48 may determine the coordinates that align the height sensor 21 with the calibration device 66 based on an alignment signal 148 generated by the height sensor 21. In this case, the alignment signal 148 would represent a detected distance between the height sensor 21 and the surface 70 of the service station 28. The controller application 48 would move the height sensor 21 so that the laser dot 138 crosses the calibration device 66 along the first axis 139 (e.g., the x axis) over a fiducial feature 150 (FIG. 12). The fiducial feature 150 may include an edge defining a step height change perceivable by the height sensor 21. The fiducial feature 150 may include the aperture 68, the raised feature 72, or any other suitable feature having a detectable height change.

As the laser dot 138 moves across the edge of fiducial feature 150, the alignment signal 148 would experience a first change in level, which is represented by line segment 152. The controller application 48 registers a first coordinate 154 of the first axis 139 in response to the first change in the alignment signal 148. As the controller application 48 continues to move the height sensor 21 so that the laser dot 138 moves across the fiducial feature 150, the alignment signal experiences a second change (represented by line segment 156) as the height sensor 21 passes over the fiducial feature 150. The controller application 48 registers a second coordinate 158 of the first axis 139 in response to the second change of the alignment signal 148. The controller application 48 may then determine a coordinate of the first axis 139 corresponding to the position of the dispensing apparatus 14 when the height sensor 21 is aligned with the fiducial feature 150 by calculating a midpoint 160 (hereinafter referred to as the "fiducial x-coordinate") between the first and second coordinates 154, 158. The fiducial x-coordinate is then used as the x-coordinate for the second axis 144 (e.g., y-axis). The height sensor 21 is then moved along the second axis 144 to find a similar midpoint coordinate (hereinafter referred to as the "fiducial y-coordinate") along second axis 144 of the fiducial feature 150. The fiducial x-coordinate and the fiducial y-coordinate are then recorded as the coordinates of the dispensing assembly 14 when the height sensor 21 is aligned with the fiducial feature 150. The fiducial x-coordinate and fiducial y-coordinate are then compared to the coordinates of the dispensing assembly 14 corresponding to the crosshairs of the camera 20 being aligned with the fiducial feature 150. Using these two sets of coordinates, the camera-height sensor offset vector is then determined as previously described.

Figure 1:
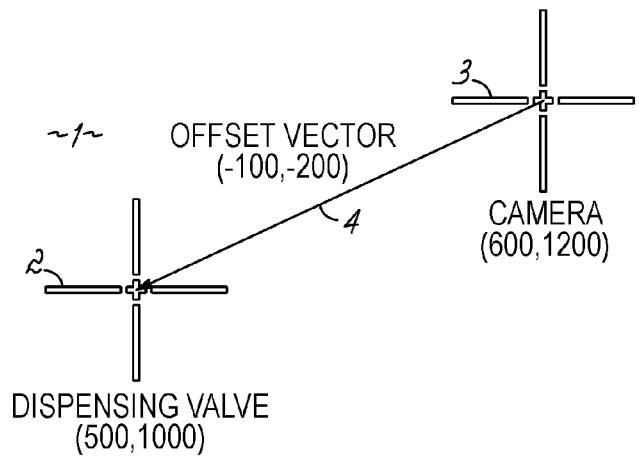
FIG. 1 is a diagrammatic view illustrating an offset vector between a dispensing valve and a camera collocated in a dispensing assembly.
Figure 2:
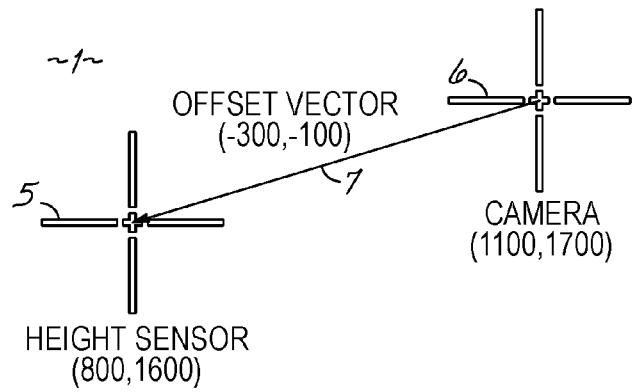
FIG. 2 is a diagrammatic view illustrating an offset vector between a height-sensor and the camera collocated in the dispensing assembly of FIG. 1.
Figure 3:
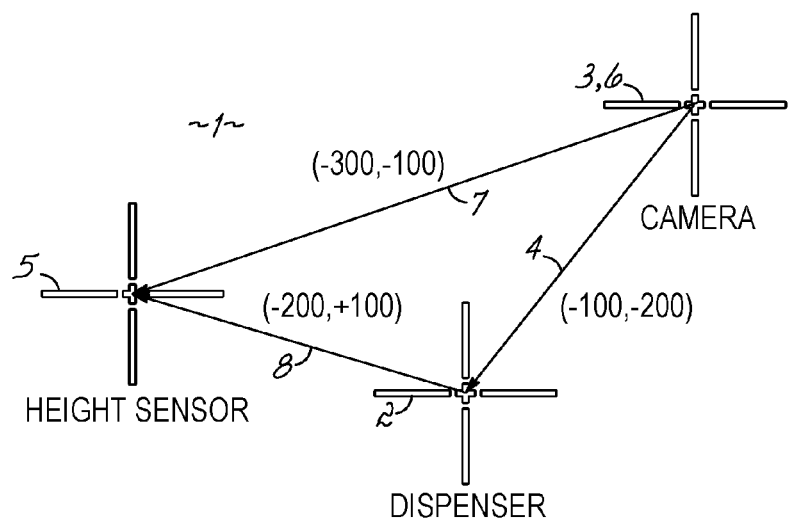
FIG. 3 is a diagrammatic view illustrating the offset vectors between the dispensing valve, the camera, and the height-sensor of FIGS. 1 and 2.
Figure 4:
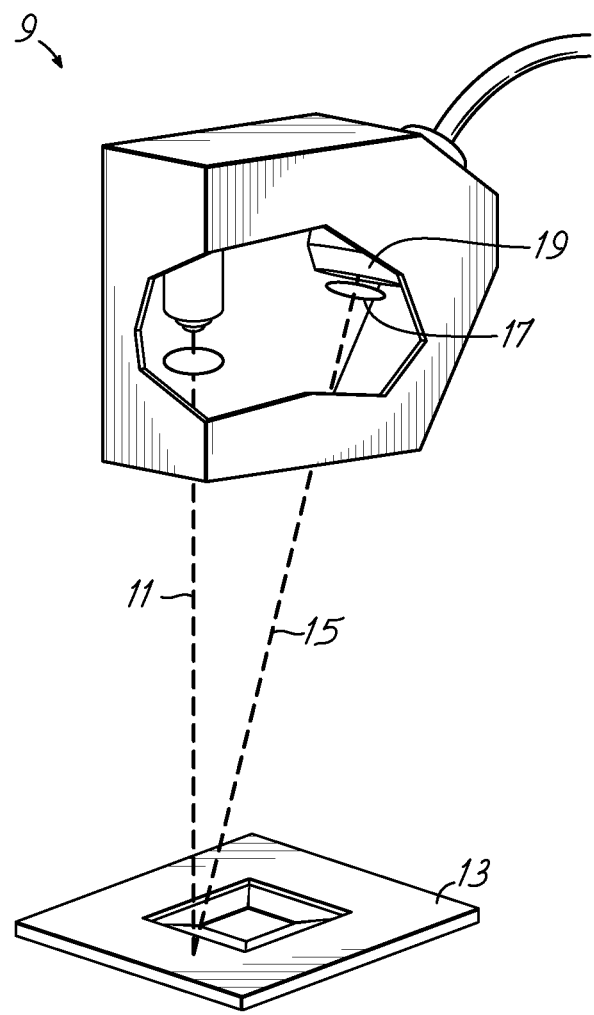
FIG. 4 is a cutaway perspective view of a laser-height sensor.

Having determined the camera-dispenser and the camera-height sensor offset vectors, the dispenser-height sensor offset vector can be determined based on these offset vectors as described above with respect to FIG. 3, if desired. Moreover, having determined the camera-height sensor offset vector automatically in accordance with this invention, the camera-dispenser offset vector in accordance with the prior art described in the background section, and dispenser-height sensor offset vector from those two offset vectors, these offset vectors can then be used to position the dispensing assembly 14 over the substrate 18 to more accurately dispense materials at the desired x-y locations on the substrate, and from the desired height, than was possible in the prior art.

Furthermore, by means of this invention, this more accurate dispensing of materials is done in a way that automatically aligns the height sensor with the calibration device in a process that avoids the inaccuracies, and stress on the operator, caused in prior systems wherein an operator was required to visually align a laser height sensor, for example, with a calibration mark on the service station.

References herein to terms such as "vertical", "horizontal", etc. are made by way of example, and not by way of limitation, to establish an absolute frame of reference. In particular, the Cartesian coordinate frame established by the x, y and z motion axes 58, 60, 62 defined herein is exemplary and used for convenience of description. It is understood by persons of ordinary skill in the art that various other frames of reference may be equivalently employed for purposes of describing the present invention.

It will be understood that when an element is described as being "connected" or "coupled" to or with another element, it can be directly connected or coupled to the other element or, instead, one or more intervening elements may be present. In contrast, when an element is described as being "directly connected" or "directly coupled" to another element, there are no intervening elements present. When an element is described as being "indirectly connected" or "indirectly coupled" to another element, there is at least one intervening element present.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "in response to" means "in reaction to" and/or "after" a first event. Thus, a second event occurring "in response to" a first event may occur immediately after the first event, or may include a time lag that occurs between the first event and the second event. In addition, the second event may be caused by the first event, or may merely occur after the first event without any causal connection.

While the invention has been illustrated by the description of one or more embodiments thereof, and while the embodiments have been described in considerable detail, they are not intended to restrict or in any way limit the scope of the appended claims to such detail. Additional advantages and modifications will readily appear to those skilled in the art. The invention in its broader aspects is therefore not limited to the specific details, representative apparatus and methods and illustrative examples shown and described. Accordingly, departures may be made from such details without departing from the scope or spirit of Applicant's general inventive concept.

What is claimed is:

1. A method of determining a position of a height sensor in a dispensing system, the method comprising:
    moving the height sensor relative to a calibration device located in a platform of the dispensing system in order to align electromagnetic radiation emitted by the height sensor with the calibration device;
    generating an alignment signal with the calibration device in response to receipt of the electromagnetic radiation; and
    determining, based on the alignment signal, a first position of the height sensor relative to the platform when the height sensor is aligned with the calibration device.

2. The method of claim 1, wherein the electromagnetic radiation is a light beam, the calibration device includes an optical sensor, and generating the alignment signal comprises:
    detecting the light beam with the optical sensor to generate the alignment signal.

3. The method of claim 2, wherein the height sensor comprises an assembly including a camera and a dispensing valve in which the camera has a fixed spatial position relative to the height sensor, and generating the alignment signal with the calibration device in response to receipt of the light beam comprises:
    moving the assembly relative to the platform to locate the assembly at the first position in which the light beam emitted from the height sensor is aligned with the optical sensor.

4. The method of claim 3, further comprising:
    moving the assembly relative to the platform to locate the assembly at a second position in which the optical sensor is aligned with a predefined location in a field of view of the camera.

5. The method of claim 3, wherein the optical sensor is adjacent to a fiducial mark on a surface facing toward the height sensor, the method further comprising:
    moving the assembly relative to the platform to locate the assembly at a second position in which the fiducial mark is aligned with a predefined location in a field of view of the camera.

6. The method of claim 3, wherein the optical sensor is aligned with an opening in a surface facing toward the height sensor, the method further comprising:
    moving the assembly relative to the platform to locate the assembly at a second position in which the opening in the surface is aligned with a predefined location in a field of view of the camera.

7. The method of claim 2, wherein the calibration device includes a surface and a fiducial feature on the surface, the fiducial feature defining a step height change, and generating the alignment signal comprises:
    transmitting a light beam from the height sensor; and
    detecting a change in a reflected portion of the light beam originating from the fiducial feature.

8. The method of claim 7, wherein the fiducial feature includes an edge defining a step height change perceivable by the height sensor, and detecting the reflected portion of the light beam comprises:
    moving the height sensor to scan the light beam across the edge; and
    as the light beam is scanned across the edge, detecting the change in the reflected portion of the light beam with the height sensor to generate the alignment signal.

9. The method of claim 1, wherein the height sensor comprises an assembly including a camera and a dispensing valve in which the camera has a fixed special position relative to the height sensor.

10. The method of claim 9, further comprising:
    moving the assembly relative to the platform to locate the assembly at the first position;
    while the assembly is located at the first position, receiving a first set of coordinates for the assembly;
    moving the assembly relative to the platform to locate the assembly at a second position in which the calibration device is aligned with a predefined location in a field of view of the camera; and
    while the assembly is located at the second position, receiving a second set of coordinates for the assembly; and
    computing a first offset vector for the height sensor relative to the camera from the first and second sets of coordinates.

11. The method of claim 10, further comprising:
    moving the assembly relative to the platform to locate the assembly at a third position;
    while the assembly is located at the third position, dispensing an amount of a material from the dispensing valve on a dispensing area adjacent to the calibration device; and moving the assembly relative to the platform to locate the assembly at a fourth position in which the amount of the material is at the predefined location in the field of view of the camera.

12. The method of claim 11, further comprising:

while the assembly is located at the third position, receiving a third set of coordinates for the assembly;

while the assembly is located at the fourth position, receiving a fourth set of coordinates for the assembly;

computing a second offset vector for the dispensing valve relative to the camera from the third and fourth sets of coordinates; and computing a third offset vector for the height sensor relative to the dispensing valve from the first and second offset vectors.

13. The method of claim 1, wherein a top surface of the platform is orthogonal to the direction of emission of the electromagnetic radiation.

\* \* \* \* \*